United States Patent [19]

McLeod

[11] 4,153,261
[45] May 8, 1979

[54] POLYURETHANE FOAM BODY WITH ALKALINE SUBSTANCE SUSPENDED THEREIN FOR PROTECTING PIPE JOINTS OF SMALL-DIAMETER PIPES

[75] Inventor: John S. McLeod, McBee, S.C.

[73] Assignee: Interpace Corporation, Parsippany, N.J.

[21] Appl. No.: 790,476

[22] Filed: Apr. 25, 1977

[51] Int. Cl.² ............................................. F16J 15/10
[52] U.S. Cl. ............................ 277/205; 277/DIG. 2
[58] Field of Search ................ 277/1, 207 A, 205, 207

[56] References Cited

U.S. PATENT DOCUMENTS

| 2,209,235 | 7/1940 | Nathan | 277/207 A |
| 3,129,964 | 4/1975 | McNeil | 277/205 |
| 3,520,541 | 7/1970 | Rohani | 277/207 A |
| 3,567,233 | 3/1971 | Stepanich | 277/207 A |
| 3,923,311 | 12/1975 | Tashlick | 277/1 |

Primary Examiner—Robert I. Smith

[57] ABSTRACT

A polyurethane foam body which has an alkaline substance suspended therein is provided with a slanted slit so that when the steel bell ring of a pipe telescopingly receives the steel spigot ring of another pipe the polyurethane foam body is compressed such that the resilient forces thereof do not cause the pipes to separate when united to form a joint.

4 Claims, 2 Drawing Figures

POLYURETHANE FOAM BODY WITH ALKALINE SUBSTANCE SUSPENDED THEREIN FOR PROTECTING PIPE JOINTS OF SMALL-DIAMETER PIPES

BACKGROUND OF THE INVENTION

The present invention is directed to a polyurethane foam body with an alkaline substance suspended therein, as disclosed in U.S. Pat. No. 3,923,311. In said patent, there is disclosed a joint filler for sealing and protecting pipe joints, especially joints with exposed metal portions of two pipes forming the joint.

The joints formed by interconnecting the ends of a first and a second pipe are subject to corrosion due to water attacking the exposed metal portions of the steel end rings of the pipes. In the first pipe, the steel end ring is constituted by a spigot having a groove formed therein for the mounting of a rubber gasket. The steel spigot ring is mounted about the end of the first pipe which is of smaller diameter than the remainder of the pipe so that it may be received telescopingly within an end of the second pipe. The second pipe has, in turn, an opening formed in its respective end which is provided with a steel bell ring which is mounted in the wall of the opening and defines a bell face. The opening with the steel bell ring therein is of slightly greater diameter than the end of the first pipe with the steel spigot ring mounted thereabout so that as the end of the first pipe is forced into the end of the second pipe, the rubber gasket is compressed by the bell flare to provide thereby a tightly sealed joint.

As the steel spigot ring is forced into the opening of the second pipe, the annular portion of the end of the second pipe or bell face forces the polyurethane foam body with an alkaline substance suspended therein into a compressed state. The polyurethane foam body also is mounted about the steel spigot ring but rearwardly of the rubber gasket. The polyurethane foam body rests against a shoulder of the first pipe so that as the bell face of the second pipe compresses the polyurethane foam body, it is forced radially outwardly at the same time as it is compressed inwardly. Due to the fact that the polyurethane foam body has an alkaline substance such as portland cement suspended therein, protection of the exposed metal surfaces of the pipes is achieved. The protection arises due to hydration of the alkaline substance by the surrounding water, which releases the alkaline substance over a period of time from the polyurethane foam. The alkaline substance is dispersed in the polyurethane foam body in a manner as disclosed in the above-mentioned patent. This patent also sets out in greater detail the precise composition of the mixture.

It has been found, however, with the above system that in use for protecting the joints of small-diameter pipes, the resilient forces exerted by the polyurethane foam body on the steel bell ring end of the second pipe are so great as to cause the kickback thereof and the eventual separation of the pipes.

SUMMARY OF THE INVENTION

It is, therefore, the primary object of the present invention to provide a polyurethane foam body with a suspended alkaline substance therein which reduces the resilient forces of the body so that when used to protect the joint of two small-diameter pipes the kickback of the second pipe having the steel bell ring thereon is prevented, thus preventing the separation of the two pipes forming the joint.

To this end, the present invention provides a slanted slit for the polyurethane foam body which extends rearwardly from the front surface thereof for contacting the end of the second pipe with the opening formed therein, toward the rear surface which abuts against the shoulder of the first pipe mounting thereon the rubber gasket. The slanted slit preferably slants away from the inner surface of the body which is in contact with the steel spigot ring toward the outer surface of the body.

As the annular portion of the second pipe having the opening formed in its end is forced against the front surface of the polyurethane body, the portion of the body above the slanted slit is caused to buckle, so that the resulting resilient forces acting on the annular portion is greatly reduced, whereby kickback of the second pipe is prevented and, therefore, preventing the separation of the two pipes.

BRIEF DESCRIPTION OF THE DRAWING

The invention will be more readily understood with reference to the following detailed description, when taken in conjunction with the accompanying drawing, wherein.

DETAILED DESCRIPTION OF THE INVENTION

Figure 1:
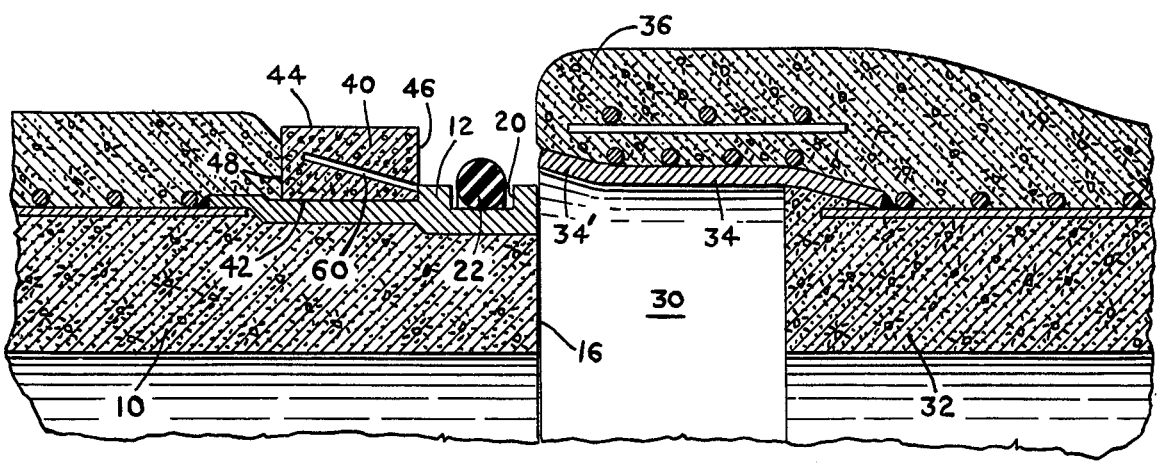
FIG. 1 is a partial vertical sectional view showing the improved polyurethane foam body with suspended alkaline substance therein of the present invention mounted on the steel spigot ring of a first pipe before the first pipe is forced into the opening of a second pipe.
Figure 2:
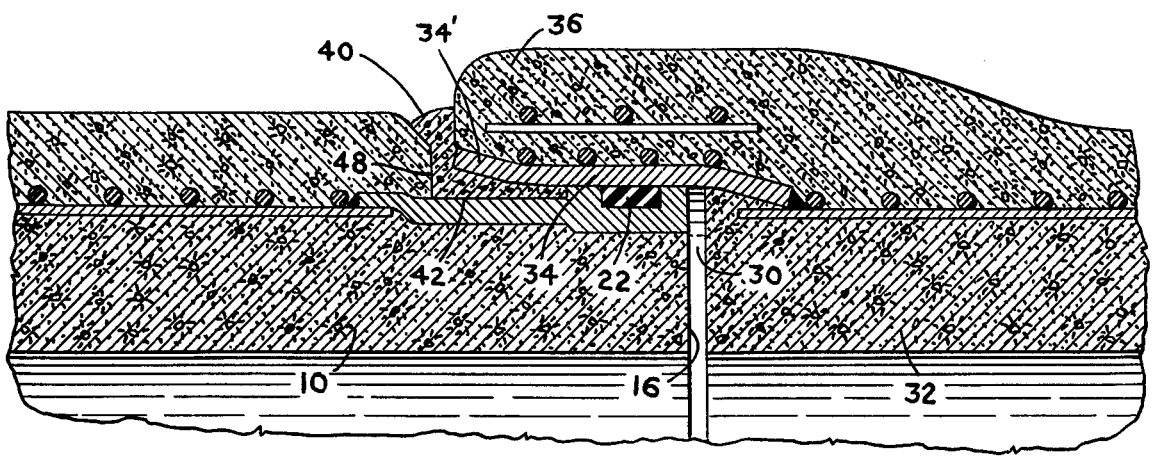
FIG. 2 is a partial vertical sectional view similar to FIG. 1 but with the first and second pipes connected to form a joint which compresses the improved polyurethane foam body with suspended alkaline substance therein of the present invention.

In FIGS. 1 and 2, there is shown a pipe joint formed by the mating ends of two small-diameter pipes. In FIG. 1, the pipes are shown prior to connection, while FIG. 2 shows the pipes connected to form the joint. The arrangement shown in FIGS. 1 and 2 is similar to that shown in the above-noted patent, with the difference being the use of the improved polyurethane body with suspended alkaline substance therein of the present invention. As disclosed in the above-noted patent, a first pipe 10 is provided with a steel spigot ring 12 which is mounted about the end 16 of the first pipe. A circular groove 20 in the steel spigot ring mounts therein a rubber gasket 22 which seals the joint connection as shown in FIG. 2. The end 16 of the first pipe 10 is telescopingly received in an opening 30 formed in the end of a second pipe 32. A steel bell ring 34 lines the wall of the opening 30 and has a flared portion 34' which together with annular portion or bell face 36 of the pipe 32 abuts against the improved polyurethane foam body 40 with suspended alkaline substance therein. The polyurethane foam body 40 is seated on the steel spigot ring 12 and has an inner surface 42 which rests on the steel spigot ring surface, an outer surface 44, a front surface 46 which is in partial engagement with the flared portion 34' and the annular portion 36 of the pipe 32, and a rear surface 48 which abuts against the shoulder of the first pipe 10. The body 40 has a slanted slit 60 which extends from the front surface 46 toward the rear surface 48, so that an end of the slit is spaced from rear surface 48. The slit is slanted away from the inner surface 42 toward the outer surface 44, as can be seen in FIG. 1.

As can be seen in FIG. 2, as the two pipes are connected to form a joint, the face of the bell 36 of the second pipe 32 compress the body 40 to the form shown in FIG. 2. Due to the fact that the slit 60 is provided, that portion of the body 40 which lies on the outer surface side of the slit 60 buckles under the force of the connection so that the combined resilient forces exerted on the bell face 36 are greatly reduced. This reduction of resilient forces arises from the fact that the shear restoring forces are reduced due to the provision of the slit 60. Thus, kickback and eventual separation of the two pipes are prevented, while at the same time the protection of the exposed steel portions of the pipes is still obtained in the manner as described in U.S. Pat. No. 3,923,311.

With the slit polyurethane foam body of the present invention, not only does a decreased resiliency result, but also further protection for the two pipes is provided due to the fact that the body is caused to extend further out radially than hitherto provided. This greater extension in the radial direction allows for filling in of small cavities formed when chunks of mortar are knocked off or otherwise removed.

While a specific embodiment of the invention has been shown and described, it is to be understood that numerous changes and modifications may be made without departing from the scope and spirit of the invention. For example, it is possible to change the angle of the slanted slit relative to the inner surface, as long as reduced reaction forces are obtained. Also the invention has been shown with pipe structures having steel end rings, but it may also be utilized with concrete pipe not having steel end rings or with pipe made of entirely different materials and construction.

I claim:

1. In a structural polyurethane foam system having an alkaline substance suspended therein for protecting the pipe joint of two interconnecting bell and spigot pipes, said system comprising a solid member having an inner surface for engagement with the spigot end of a first pipe, an outer surface for partial engagement with the bell end of a second pipe when the second pipe telescopingly receives therein said spigot end of the first pipe to form a pipe joint, a front surface for partial engagement with an end face of said bell ring of the second pipe when the first and second pipes are interconnected, and a rear surface for partial engagement with a spigot shoulder of the first pipe, wherein the improvement comprises:

means for decreasing the resilient forces of said solid member so that when the first and second pipes are interconnected to form a joint the force urging the second pipe away from the first pipe is small enough to prevent separation of the two pipes, said means for decreasing the resilient forces comprising a slit formed in said solid member, said slit extending from said front surface rearwardly toward said rear surface and terminating at a distance from said rear surface to form two portions for said solid member constituted by an outer portion radially outwards of the slit and an inner portion radially inwards of the slit, the position of the slit being such that when the pipes are interconnected, said outer portion is buckled by contact with the bell end of the second pipe while the inner portion remains substantially intact on said spigot end.

2. The improvement according to claim 1, wherein said slit is slanted and comprises a first end at said front surface located between said inner and outer surfaces, and a second end spaced from said rear surface, said second end being a greater distance from said inner surface than said first end as measured by perpendiculars to said inner surface.

3. The improvement according to claim 2, wherein said solid member is a circular ring having a rectangular cross-section.

4. The improvement according to claim 3 wherein said slit extends from said first end in a direction axially and radially outwards towards said second end, said slit being annular and flaring conically from said first end to said second end, the arrangement being such that when the pipes are interconnected the end face of the bell ring acts on said outer portion to buckle the same along the slit.

* * * * *